United States Patent [19]

Esaki et al.

[11] Patent Number: 5,617,625
[45] Date of Patent: Apr. 8, 1997

[54] METHOD FOR ASSEMBLING PHOTOGRAPHIC FILM CASSETTE

[75] Inventors: Toshiro Esaki; Masayuki Kubota, both of Kanagawa, Japan

[73] Assignee: Fuji Photo Film Co., Ltd., Kanagawa, Japan

[21] Appl. No.: 420,692

[22] Filed: Apr. 12, 1995

[30] Foreign Application Priority Data

Apr. 15, 1994 [JP] Japan .................................. 6-077570

[51] Int. Cl.$^6$ .................................................. B21D 39/03
[52] U.S. Cl. .............................. 29/430; 29/434; 29/455.1; 29/463; 29/469; 29/525; 29/806
[58] Field of Search .......................... 29/430, 434, 455.1, 29/463, 469, 525, 806, 784, 799

[56] References Cited

U.S. PATENT DOCUMENTS

| | | | |
|---|---|---|---|
| 4,080,711 | 3/1978 | Kawada et al. | 29/427 |
| 4,614,019 | 9/1986 | Shimizu et al. | 29/450 |
| 4,674,181 | 6/1987 | Hamada et al. | 29/430 |
| 4,815,190 | 3/1989 | Haba, Jr. et al. | 29/430 |
| 4,834,306 | 5/1989 | Robertson et al. | 242/71.1 |
| 4,846,418 | 7/1989 | Fairman | 242/71.1 |
| 4,887,113 | 12/1989 | Niedospial, Jr. | 354/275 |
| 5,049,912 | 9/1991 | Pagano et al. | 354/275 |

FOREIGN PATENT DOCUMENTS

| | | |
|---|---|---|
| 0406815A2 | 7/1990 | European Pat. Off. . |
| 0622662A3 | 11/1994 | European Pat. Off. . |

*Primary Examiner*—David P. Bryant
*Attorney, Agent, or Firm*—Sughrue, Mion, Zinn Macpeak & Seas

[57] ABSTRACT

A method and an apparatus for assembling photographic film cassettes each comprising a spool assembly and a pair of shell halves. A plurality of pallets are stepwise conveyed on a pallet conveyer. Each pallet has a spool holder, an intermediate holder and a shell holder. Parts of the spool assembly are sequentially fed to the spool holder and are assembled into the spool assembly at the spool holder. The spool assembly is transferred from the spool holder to the intermediate holder to be turned from a vertical into a horizontal orientation. Thereafter, the spool assembly and other parts of the photographic film cassette are sequentially fed to the shell holder and are assembled into the photographic film cassette at the shell holder.

3 Claims, 8 Drawing Sheets

METHOD FOR ASSEMBLING
PHOTOGRAPHIC FILM CASSETTE

BACKGROUND OF THE INVENTION

1. Field of the Invention

The present invention relates to a method of assembling photographic film cassettes, and an apparatus for practicing the method.

2. Related Art

Photographic film of the 135 type, contained in a cassette, is among the most popular formats of photographic film. A known 135 photographic film cassette has a cassette shell constituted of a cylindrical body, formed from a thin metal sheet, and two caps fitted thereon. The cassette has a spool contained therein on which photographic film is wound in a form of a roll. To assemble this photographic film cassette, several methods are known. For example, U.S. Pat. No. 4,614,019 (corresponding to JPB 2-691) discloses a process of winding the photographic film on the spool, and then assembling the cassette in a darkroom; U.S. Pat. No. 4,080,711 (corresponding to JPB 60-48748) discloses a process of bringing the assembled cassette shell into the darkroom, disassembling the cassette shell for insertion of the photographic film, inserting the photographic film wound on the spool, and then assembling the cassette shell.

U.S. Pat. No. 4,834,306 (corresponding to JPA 1-306845), U.S. Pat. No. 4,846,418 and European Publication EP-A2 0 406 815 (corresponding to JPA 3-37645), each disclose a photographic film cassette in which a cassette shell is constituted of parts formed from resin, and rotation of a spool causes a leader of the photographic film to exit to the outside of the cassette. Such a leader-advancing cassette is different from conventional photographic film cassettes because the leader of the photographic film is fully contained within the cassette both before exposure and after exposure. Such a cassette is advantageous in that the photographic film is reliably protected from accidental exposure to ambient light, and in that the cassette is easily handled.

Such a leader-advancing cassette includes elements not utilized in conventional cassettes. As disclosed, for example, in U.S. Pat. No. 4,834,306 and U.S. Pat. No. 5,049,912, a light-shielding shutter member may be mounted openably in a photographic film passage port of this type of film cassette for protecting the inside from ambient light. Or a visual indicator member may be incorporated in such a cassette, to appear externally for indicating the exposed condition of the photographic film. However, production of such a leader-advancing cassette has many inherent problems due to the increase in the number of the parts. Particularly when the cassette shells must be assembled or disassembled in a dark room, the assembling operation is so complicated that efficiency of production is difficult to increase. In such a case, even an automated assembling machine does not reliably increase production efficiency in view of maintenance and repair.

The problems are more complicated in a case of a photographic film cassette wherein a spool is an assembly constituted of a pair of flanges force-fitted on the spool core, and the spool assembly is mounted in one shell half before the other shell half is joined therewith. This is because an independent assembling process for assembling the spool assembly is necessary before a primary assembling process of the film cassette, wherein the spool assembly, the shutter plate and other parts are mounted into the cassette shell. In such a case, there are at least two assembling lines and at least a transfer conveyor for connecting the two lines. Therefore, the mechanisms of the conventional systems are complicated. The need for transferring works between the lines increases the occurrence of problems.

To solve the above problems, an improvement is suggested in U.S. Ser. No. 08/233,261 (filed on Apr. 26, 1994), which uses a pallet 80 having a spool holder 81 and a shell holder 82 thereon as shown in FIG. 9. A plurality of such pallets 80 are successively conveyed along an assembling line, while parts of a cassette shell are sequentially fed to the pallet 80, wherein the parts of a spool assembly 83 are assembled in the spool holder 81 while its spool core is oriented in a vertical position, and that the complete spool assembly 83 and other parts are assembled into the cassette shell in the shell holder 82 while the axis of the cassette shell is horizontal. Since the spool assembly 83 is moved from the spool holder 81 to the shell holder 82 of the same pallet 80 after a shell half 84 is placed in the shell holder 82 on the same assembling line, it is unnecessary to provide two assembling lines. Because of the single assembling line, it is unnecessary to provide interconnecting devices which would otherwise be necessary for connecting primary and secondary assembling lines.

On the other hand, taking account any variability between lots of each kind of work pieces, a high accuracy, e.g., 0.55 mm or so, is necessary when mounting the spool assembly 83 in the shell half 84. However, for mounting the spool assembly 82 held in the spool holder 81 into the shell half 84 held in the shell holder 82 of the same pallet 80, it is necessary to move a chuck member or robot hand 85 of a chuck unit 86 in many directions after the chuck member 85 nips the spool assembly 83. That is, the chuck member 85 moves up in a vertical direction relative to the pallet 80, hereinafter referred to as Z-axis direction, to pull the spool assembly 83 off the spool holder 81, and then rotates through an angle of 90° to orient the spool assembly 83 horizontal and parallel to an axial direction of the shell half 84 held in the shell holder 82, hereinafter referred to as Y-axis direction. Thereafter, the chuck member 85 moves in a direction toward the shell holder 82, hereinafter referred to as X-axis direction, to locate the spool assembly 83 in a position right above the shell half 84 in the shell holder 82. Next, the chuck member 85 should move in the Y-axis direction so as to position the spool assembly 83 relative to the shell half 84. Then, the chuck member 85 moves down and releases the spool assembly 83 to put in the shell half 84.

Accordingly, the chuck member 85 requires a complicated and relatively large scale chuck drive mechanism 86. Besides that, many directional movements makes it difficult to ensure the high accuracy necessary for mounting the spool 83 in the shell half 84. If the shell half 84 has hooks 84a for engagement with a counterpart shell half, as the hooks 84a protrude upwards from the shell holder 82, the chuck member 85 must not interfere with the hooks 84a. Therefore, the spool assembly 83 should be dropped from a higher position into the shell half 84, or the chuck member 85 must be narrower than the spacing between the hooks 84a. This lowers the stability and hence the accuracy of assembly operation.

To avoid the above described problems, it may be possible to mount the spool assembly 83 in a shell half 84 that is held in a shell holder 82 of another pallet 80, by transferring the spool assembly 83 from one pallet to another directly or through a transit station disposed besides the pallet conveyer. In either case, however, the amount of movement of the spool assembly 83 to be made within a transport step is so large that the maximum acceleration will increase, for instance, up to about 1.8 Gs when the interval between transport steps of the pallet conveyer is 1 second. The larger acceleration is disadvantageous in terms of mechanical construction.

Also a conventional double-hand system using two chucks cannot be adopted in the assembling system as shown in FIG. 9, since each pallet has the spool holder and the shell holder so as to allow the spool assembly to be assembled on the same pallet that is used for assembling the other parts of the cassette shell.

The above Y-axial movement of the chuck member 85 can be omitted if the spool assembly 83 is rotated by 90° about its longitudinal center or half-length position. However, because of limited dimensions, it is difficult to design the chuck unit 87 to turn the spool assembly 83 about the longitudinal center thereof without any deviation.

It might be possible to shift the spool holder from the center of the shell holder in the Y-axis direction so that the spool assembly need not be moved in the Y-axis direction. However, this is not preferable because such a pallet tends to lose balance especially when the flange is force-fitted to the spool core or when the shell halves are force-fitted to each other. Also, the pallet must be widened correspondingly.

OBJECT OF THE INVENTION

In view of the above problems, an object of the present invention is to provide an automatic assembling method for photographic film cassettes, and an apparatus for that method, which enables a highly accurate and efficient assembly operation using pallets each of which has a spool holder and a shell holder, for assembling a spool assembly in the side of the spool holder and assembling the spool assembly and other parts into a cassette shell in the side of the shell holder.

SUMMARY OF THE INVENTION

To solve the above and other objects, the present invention provides an intermediate holder on each pallet. A spool assembly assembled at a spool holder is transitionally placed on the intermediate holder of the same pallet before being mounted in a shell half held in a shell holder of this pallet. While the spool holder is arranged to hold the spool assembly vertically, and the shell holder is arranged to hold the shell half horizontally, the intermediate holder is arranged to hold the spool assembly horizontally and parallel with its mounting position in the shell half in the shell holder.

According to the invention, it is unnecessary to move the spool assembly in many directions by a large amount within a short interval. Therefore, it is possible to achieve a high speed and high accuracy assembly operation with reliability without increasing the maximum acceleration of a mounting mechanism such as a chuck member.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
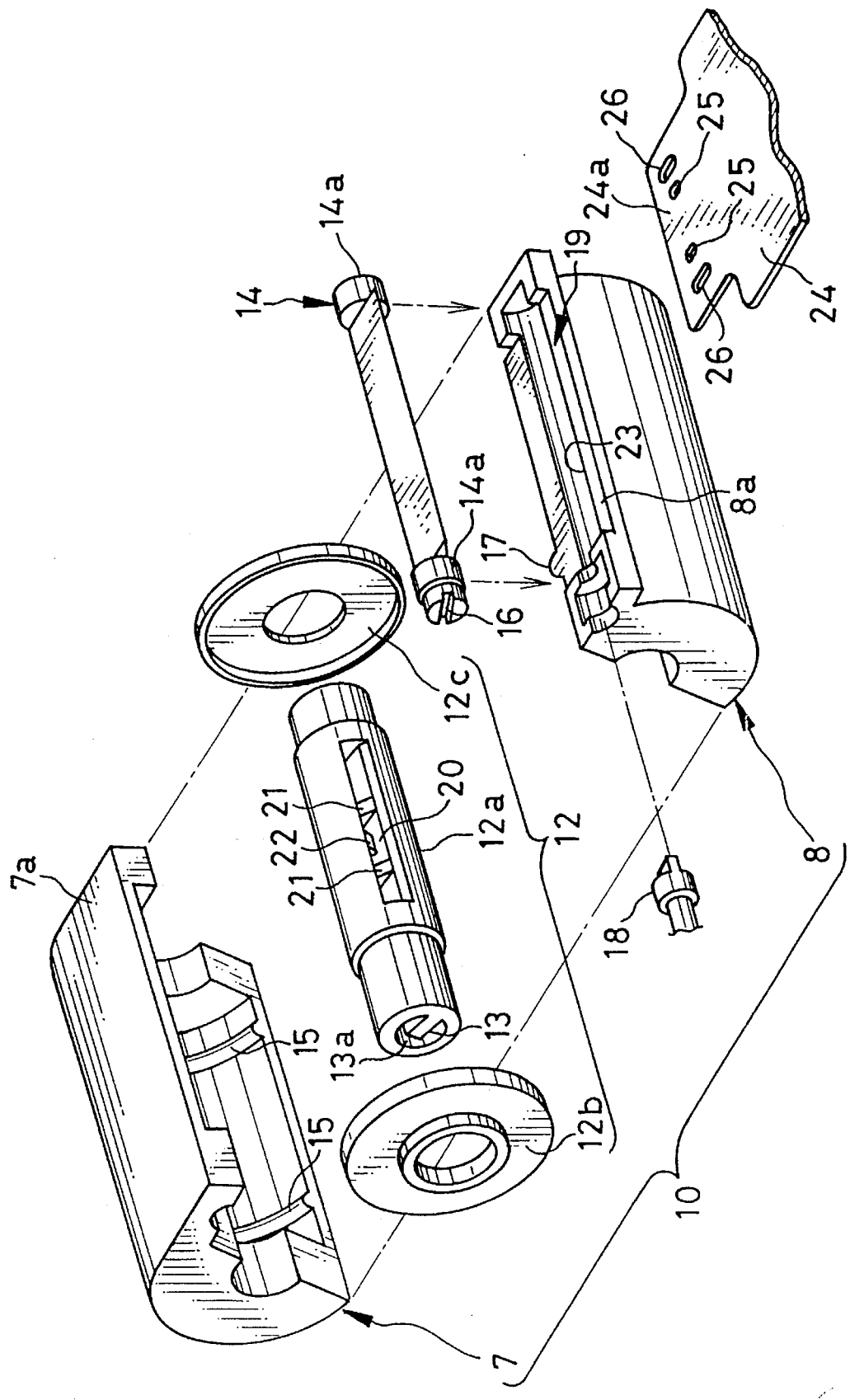
FIG. 1 is an exploded perspective view illustrating an example of a leader-advancing film cassette.

FIG. 1 illustrates a photographic film cassette to be assembled by a cassette assembling apparatus according to a preferred embodiment of the present invention. A spool assembly 12 is rotatably contained in a cassette shell 10 constituted of a pair of shell halves 7 and 8 molded from resin. Ridges 15 are formed on the inside of the shell halves 7 and 8. When photographic film 24 is wound around the spool assembly 12 and contained in the cassette shell 10, the ridges 15 are in contact with the outermost turn of the photographic film 24 to prevent the roll of the photographic film 24 from loosening. When the spool assembly 12 is rotated in the direction to unwind the film 24, clockwise in FIG. 1, the roll of the photographic film 24 is also rotated clockwise. A separator claw 17 is formed inside of shell half 8. During rotation of the roll of the photographic film 24, a leading end of the photographic film abuts on the separator claw 17, which separates the leading end from the roll of the film 24.

Port walls 7a and 8a are formed on the shell halves 7 and 8. When the shell halves 7 and 8 are joined together, the port walls 7a and 8a define a photographic film passage port 19. A shutter 14 is rotatably mounted in a cylindrical cavity formed by a pair of semi-cylindrical recesses 23 formed inside the port walls 7a and 8a. Both ends of the shutter 14 are provided with rotary shaft portions 14a supported between the port walls 7a and 8a, so that the shutter 14 is rotatable about an axis which is parallel to the spool assembly 12. An end of one of the shaft portions 14a has a key 16, which extends through a hole formed in the cassette shell 10. When an opener member 18 is fitted on the key 16 and rotates the key 16, the shutter 14 is rotated between positions of blocking and opening a film passage 19 formed between the port walls 7a and 8a.

The spool assembly 12 is constituted of a spool core 12a and a pair of flanges 12b and 12c fitted on the spool core 12a. The photographic film 24 is wound on the spool core 12a between the flanges 12b and 12c. Both ends of the spool assembly 12 extend through faces of the cassette shell 10, and are provided with keys 13. The keys 13 are used for engagement with a drive member for rotating the spool assembly 12 in a known manner. A notch 13a is formed in one of the keys 13, for externally indicating the rotational position of the spool assembly 12. This indication is necessary for inserting the film trailer 24a into a slot 20 formed along the spool core 12a.

Inside the slot 20 are arranged two retaining claws 21 and a slip-preventive ridge 22 which protrudes toward, and is disposed between, the retaining claws 21. The right side of the slot 20 is adapted to receive the film trailer 24a. The film trailer 24a has a pair of retaining holes 25 formed therein, which are engageable with the retaining claws 21. The slip-preventing ridge presses the trailer end 24a in the direction opposite to projecting of the retaining claws 21, so that the holes 25 are engaged with the retaining claws 21, even if a force tending to pull the photographic film 24 from the slot 20 should be applied to the trailer 24a. The trailer 24a is further provided with a pair of pick-up holes 26 which are disposed outside the pair of retaining holes 25 in the lateral direction of the film 24. The pick-up holes 26 are used for inserting the film trailer 24a into the slot 20 with a not-shown jig.

Figure 2:
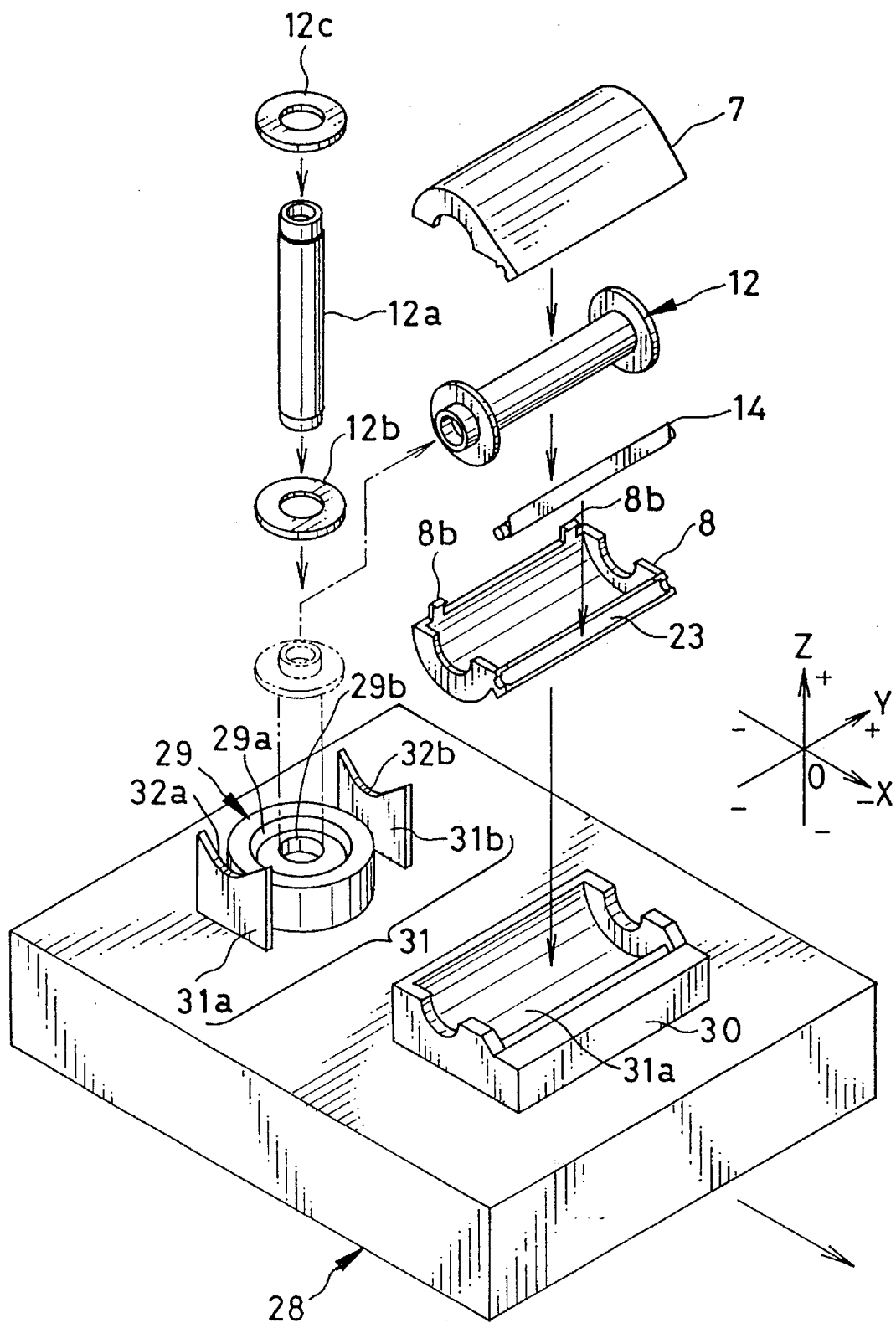
FIG. 2 is an explanatory perspective view of a pallet utilized for assembling a spool assembly and a cassette shell of the leader-advancing film cassette as shown in FIG. 1.

FIG. 2 illustrates a pallet 28 utilized for assembling the above-described cassette shell 10. The pallet 28 has a cylindrical spool holder 29 for holding the spool assembly 12, and a shell holder 30 for holding the one shell half 8, hereinafter referred to as a lower shell half 8. The spool holder 29 and the shell holder 30 are spaced in a pallet conveying direction, hereinafter referred to as X-axis direction. The pallet 28 also has an intermediate holder 31, which is constituted of a pair of supporting members 31a and 31b disposed on opposite sides of the spool holder 29 in a transverse direction perpendicular to the X-axis direction, hereinafter referred to as Y-axis direction.

The spool holder 29 has a flange accepting recess 29a and a spool core accepting hole 29b formed therein. After the flange 12b is positioned in the recess 29a, one end of the spool core 12a is inserted in the hole 29b, while being force-fitted through the flange 12b. Thereafter, the other flange 12c is force fitted on the opposite end of the spool core 12a, completing the spool assembly 12. Thus, the spool assembly 12 is held in the spool holder 29 with its axis oriented vertical to the pallet 28, that is, in the Z-axis direction.

Figure 5:
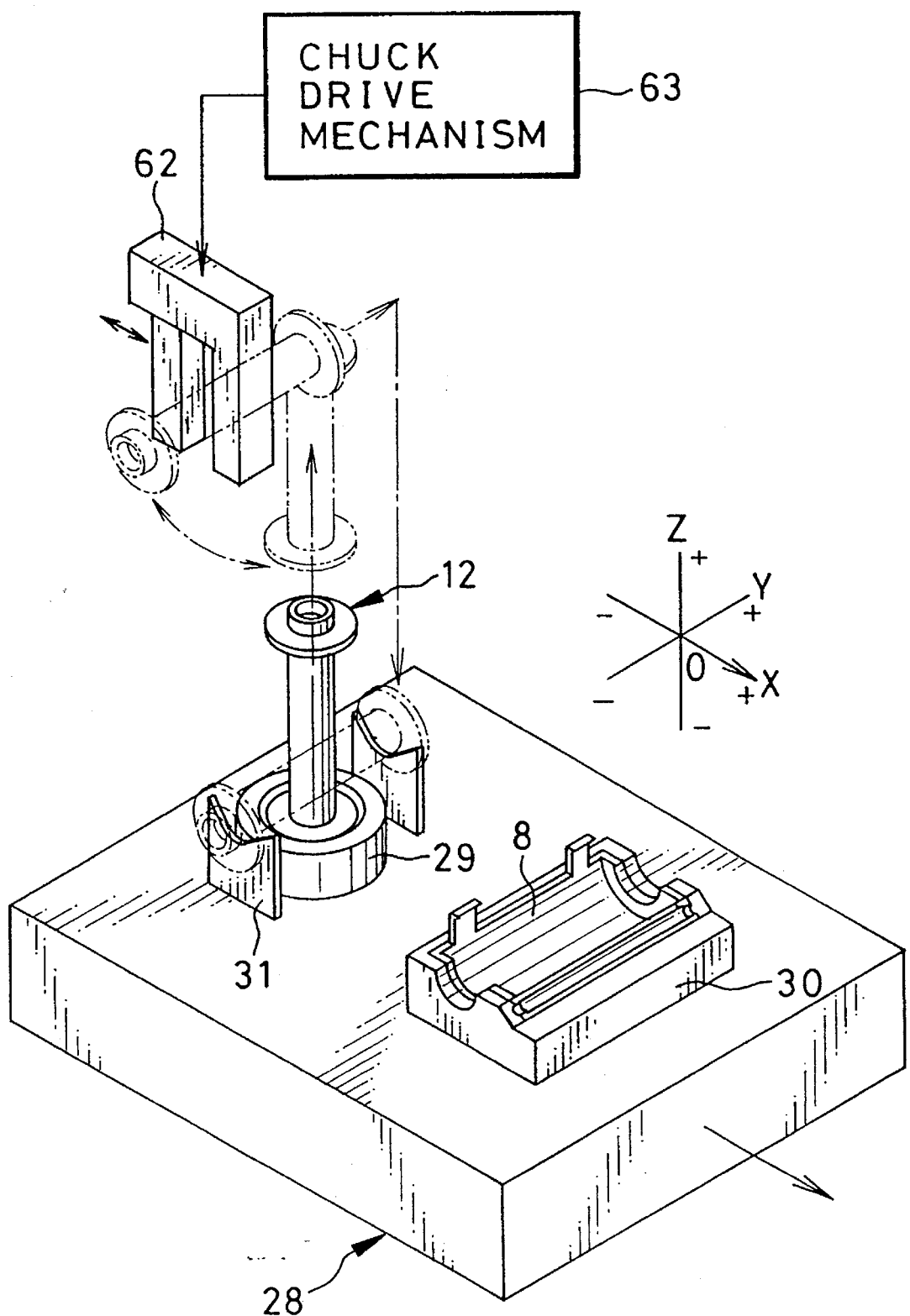
FIG. 5 is an explanatory view of a pick-and-place device for moving the spool assembly from a spool holder to an intermediate holder.

The complete spool assembly 12 is pulled off the spool holder 29 and is once placed on the intermediate holder 31, as is shown in FIG. 5. The supporting members 31a and 31b of the intermediate holder 31 each has a recess 32 formed in a top side thereof for supporting the spool assembly 12 at the spool core 12a with its axis oriented horizontal. Also, the supporting members 31a and 31b are arranged such that the axis of the spool assembly 12 held thereon extends across the axis or center of the spool holder 29 in the Y-axis direction. Since the spool holder 29 coaxially holds the spool assembly 12, the horizontal axis of the spool assembly 12 held on the intermediate holder 31 intersects the vertical axis of the spool assembly 12 held in the spool holder 29.

The shell holder 30 has a recess 30a formed therein, whose inside surface corresponds to the outward form of the lower shell half 8 to hold the lower shell half 8 stationary therein with its inside up and its axis oriented in the Y-axis direction, that is, parallel to the axis of the spool assembly 12 on the intermediate supporting holder 31. Also, the location of the shell holder 30 in the Y-axis direction is adjusted to the location of the intermediate holder 31 such that the spool assembly 12 may be mounted in the lower shell 8 without the need for changing its position in the Y-axis direction from the position on the intermediate holder 31.

After the lower shell half 8 is placed in the shell holder 30, the shutter 14 is mounted in the semi-cylindrical recess 23 of the lower shell half 8. Thereafter, the spool assembly 12 is mounted in the lower shell half 8 parallel to the Y-axis direction or the axial direction of the lower shell half 8. The other or upper shell half 7 is then joined to the lower shell half 8, for example through hooks 8b, to complete the cassette shell 10. Finally, the complete cassette shell 10 is removed from the shell holder 30.

Figure 3:
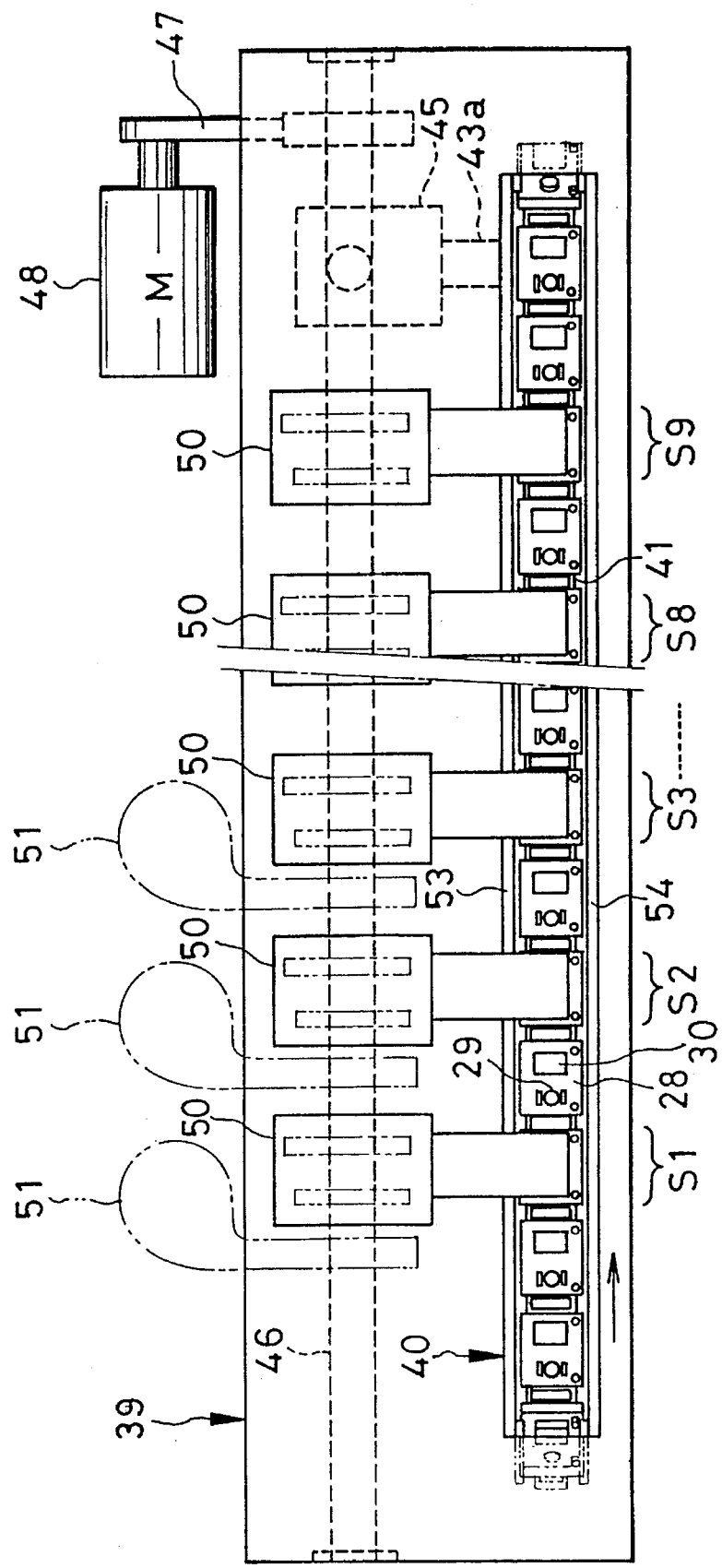
FIG. 3 is a schematic top plan view illustrating an assembling unit with a pallet conveyor for conveying the pallets as shown in FIG. 2.
Figure 4:
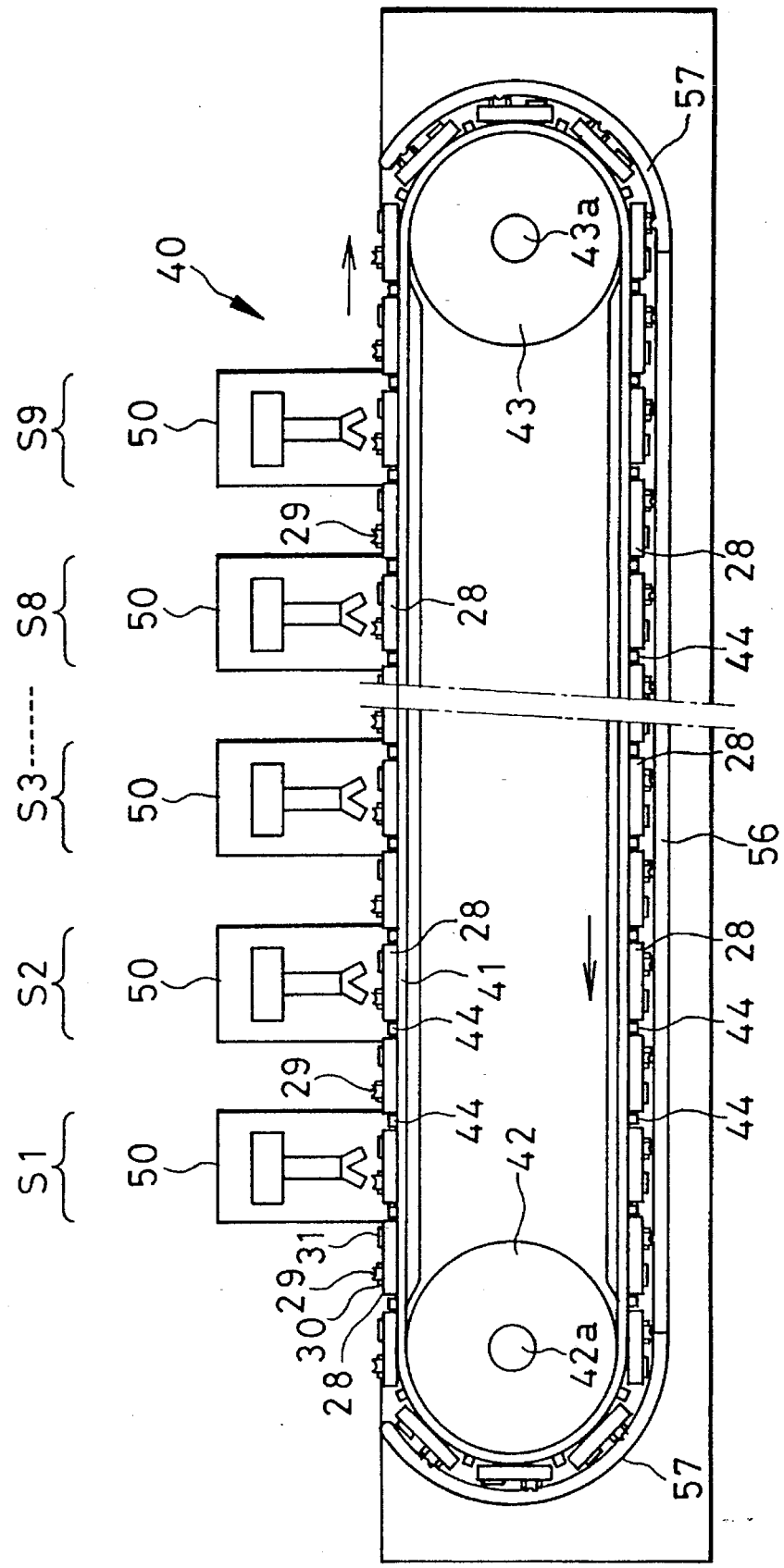
FIG. 4 is a schematic side view of the assembling unit shown in FIG. 3.

The above-described assembly operation is performed by an assembling unit 39 as shown in FIGS. 3 and 4, wherein the pallets 28 are successively conveyed by a pallet conveyer 40. The pallet conveyor 40 is constituted of an endless belt 41 circulating horizontally around pulleys 42 and 43 whose rotary shafts 42a and 43a extend in parallel with each other in a horizontal plane. The endless belt 41 has a plurality of pallet spacers 44 mounted on the bearing surface thereof. The pallet spacers 44 are spaced equally in the longitudinal direction of the belt 41 by a distance slightly longer than the length of the pallet 28. The pallet spacers 44 are rectangular ridges projecting from the bearing surface of the belt 41, which confine the pallets 28 at the leading and trailing ends thereof in the conveying or X-axis direction. Instead of the rectangular ridges 44, pallet spacers may be formed by pins which are adapted to be loosely engaged in holes which may be formed in the bottom of pallets.

As shown in FIG. 3, the shaft 43a of the pulley 43 is connected to a cam shaft 46 through an indexing unit 45 for transporting the endless belt 41 stepwise at constant intervals. The cam shaft 46 is driven by a motor 48 through a transmission belt 47. The indexing unit 45 is driven by the cam shaft 46 to intermittently rotate the pulley 43 by a constant angle. Thus, the pallets 28 are advanced by a constant amount per unit time, e.g., 1 second, through the endless belt 41.

A plurality of pick-and-place devices 50 are disposed along an upper path of the endless belt 41 of the pallet conveyer 40 at every other stop position of the pallets 28, to assemble the respective parts of the cassette shell 10, such as the shell halves 7 and 8, the shutter plate 14, the spool core 12a and the flanges 12b and 12c, appropriately in the holders 30 and 29 of the pallets 28. The last pick-and-place device 50 in the order of the pallet conveying direction, removes the complete cassette shell 10 from the shell holder 30 and discharges it from the pallet conveyer 40. The pick-and-place devices 50 are also driven by the cam shaft 46 through cam members in a conventional manner. Hereinafter, the stop positions of the pallets 28 corresponding to the pick-and-place devices 50 will be referred to as assembling stations as shown by S1 to S9 in FIGS. 3 and 4.

Figure 6:
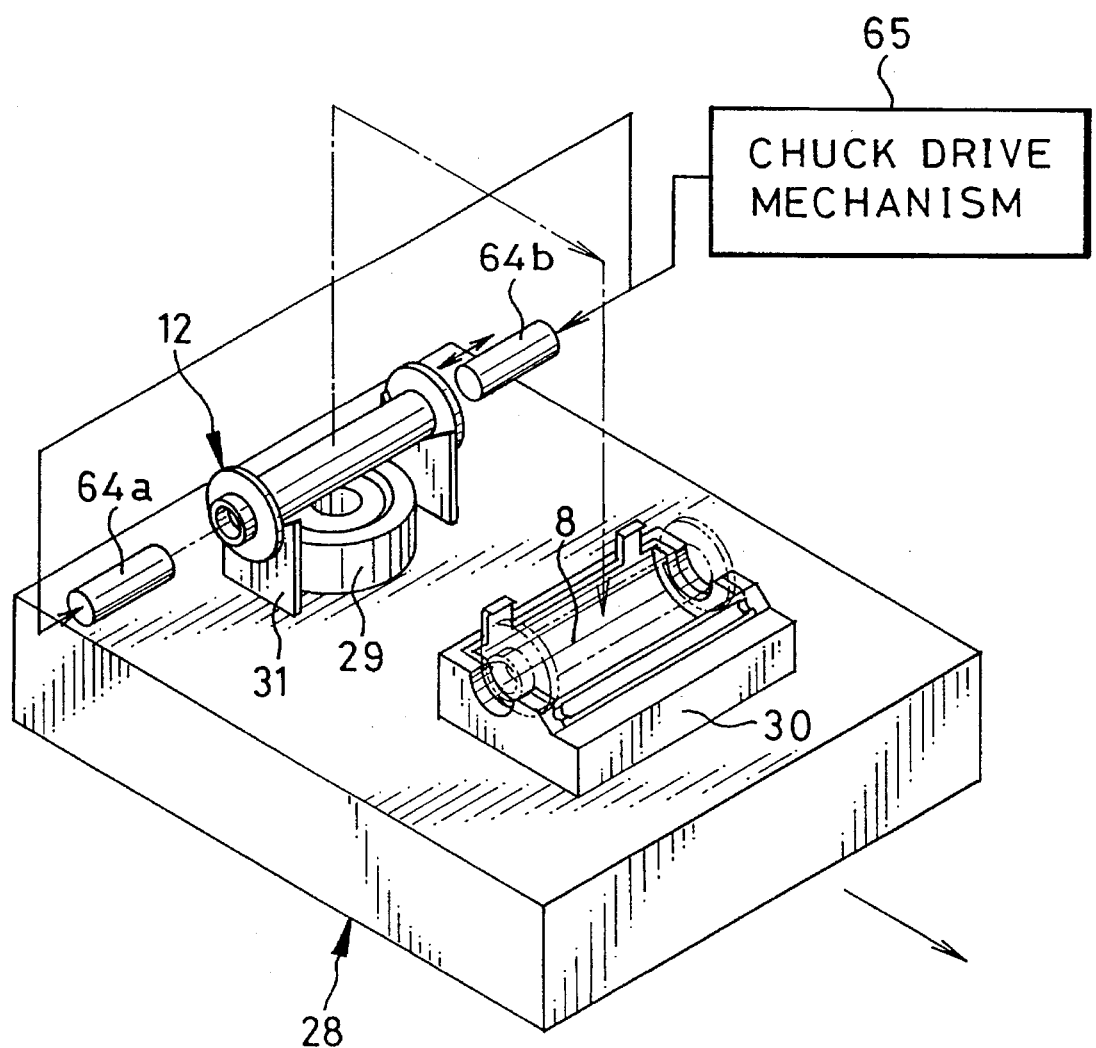
FIG. 6 is an explanatory view of a pick-and-place device for mounting the spool assembly, which is held on the intermediate holder, into a shell half which is held in a shell holder.

Parts feeders 51 are disposed besides the pick-and-place devices 50, each for feeding the designated parts one after another to the associated pick-and-place device 50. Of course, no parts feeder is allocated to the last station S9. According to the invention, two of the stations S1 to S9, e.g., the fourth and seventh stations S4 and S7 are used for placing the complete spool assembly 12 onto the intermediate holder 31, and moving the spool assembly 12 therefrom into the lower shell half 8. Also in either of the two stations S4 and S7, no parts feeder is allocated, and the pick-and-place device 50 is constructed as shown in FIG. 5 or 6.

The pick-and-place device 50 of the fourth station S4 is constituted of a chuck member 62 and a chuck drive mechanism 63. The chuck member 62 is adapted to clamp the spool assembly 12 at its middle portion so as to move the spool assembly 12 from the spool holder 29 to the intermediate holder 31. The chuck drive mechanism 63 drives the chuck member 62 to clamp and release the spool assembly 12, move in the Z-axis direction and the Y-axis direction, as well as rotate through an angle of 90° for moving the spool assembly 12 from the spool holder 29 to the intermediate holder 31.

The pick-and-place device 50 of the seventh station S7 is constituted of a pair of chuck members 64a and 64b and a chuck drive mechanism 66. The chuck members 64a and 64b are spaced in the Y-axis direction, and are moved by the chuck drive mechanism 65 toward each other to clamp the spool assembly 12 at its opposite ends when the spool assembly 12 is held on the intermediate holder 31. The chuck drive mechanism 65 also moves the chuck members 64a and 64b together in the Z-axis and the X-axis directions for moving the spool assembly 12 from the intermediate holder 31 to the lower shell half 8 in the shell holder 30.

Referring again to FIGS. 3 and 4, pallet guide fences 53 and 54 are provided on lateral sides of the endless belt 41 along the upper path of the belt 41, to limit lateral movement of the pallets 28 on the endless belt 41. The pallet guide fences 53 and 54 are mounted on an upper surface of a guide base 55, on which the endless belt 41 is guided in the horizontal state. Along a lower path of the endless belt 41 and around the pulleys 42 and 43, anti-drop guide rails 56 and 57 are provided for preventing the pallets 28 from dropping off the endless belt 41, as is shown in FIG. 4. The anti-drop guide rails 56 are constituted of a pair of rails disposed along lateral sides of the endless belt 41 and bent to catch the lateral edges of the pallets so that the pallets 28 may not drop down in due to their weight. The anti-drop guide rails 57 have the same construction and function as the anti-drop guide rails 56. The lower path of the endless belt 41 functions as a feed back line for feeding empty pallets 28 back to the assembling line.

A not-shown pallet positioning unit is disposed in association with each pick-and-place device 50. For example, the pallet positioning unit has a lateral positioning plate and a longitudinal positioning plate, which are disposed on opposite lateral sides of the pallets 28 to be movable in the lateral direction of the pallet 28, so as to push the pallet 28 at the opposite lateral edges to position the pallet in the longitudinal and lateral directions.

The assembling operations of the cassette shell 10 are performed, for example, in the following sequence.

The respective pallets 28 are periodically advanced by the pallet conveyer 40 to be seriatim fed to the respective assembling stations S1 to S9, as is shown in FIGS. 3 and 4. In the first assembling station S1, the flange 12b is set in the flange accepting recess 29a of the spool holder 29 of the pallet 28. In the second assembling station S2, one end of the spool core 12a is fitted in the spool core accepting hole 29b of the spool holder 29, so that the flange 12b is force-fitted on the one end, i.e. the lower end relative to the pallet 28, of the spool core 12a. In the third assembling station S3, the flange 12c is fitted on the other end, i.e. the upper end relative to the pallet 28, of the spool core 12a which is still fitted in the spool core accepting hole 29b.

In the fourth assembling station S4, the chuck member 62 pulls the complete spool assembly 12 off the spool holder 29 to put onto the intermediate holder 31. The chuck member 62 holds the middle portion of the spool core 12a and then moves up in the Z-axis direction to remove the lower end of the spool core 12a from the spool holder 29. Then, the chuck member 62 rotates by 90 degrees to turn the spool assembly 12 into a horizontal position. Thereafter, the chuck member 62 moves in the Y-axis direction to put the longitudinal center of the spool assembly 12 on the center or the axis of the spool holder 29, while moving down in the Z-axis direction by a predetermined amount. Then, the chuck 34 is opened to put the spool assembly on the holding members 31a and 31b of the intermediate holder 31.

Figure 7:
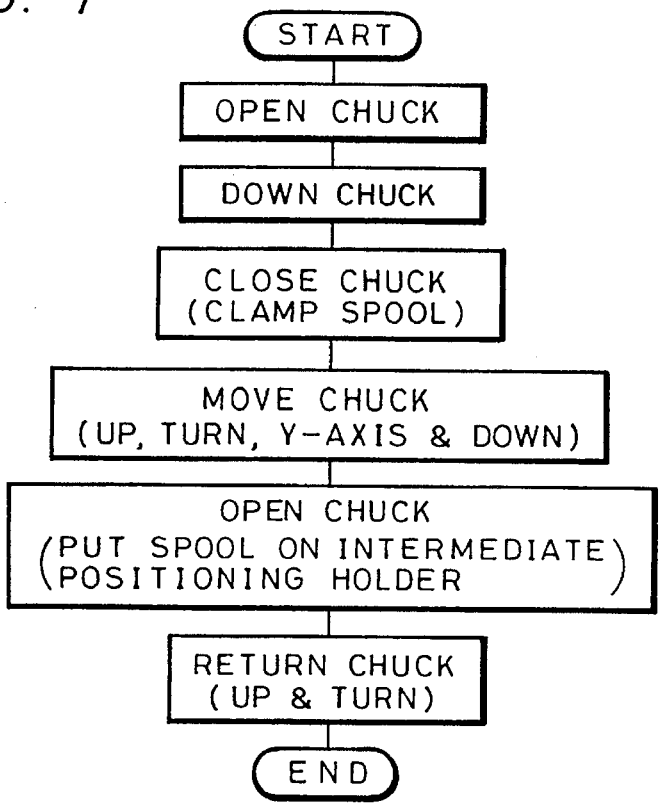
FIG. 7 is a flow chart illustrating the operation of the pick-and-place device shown in FIG. 5.
Figure 8:
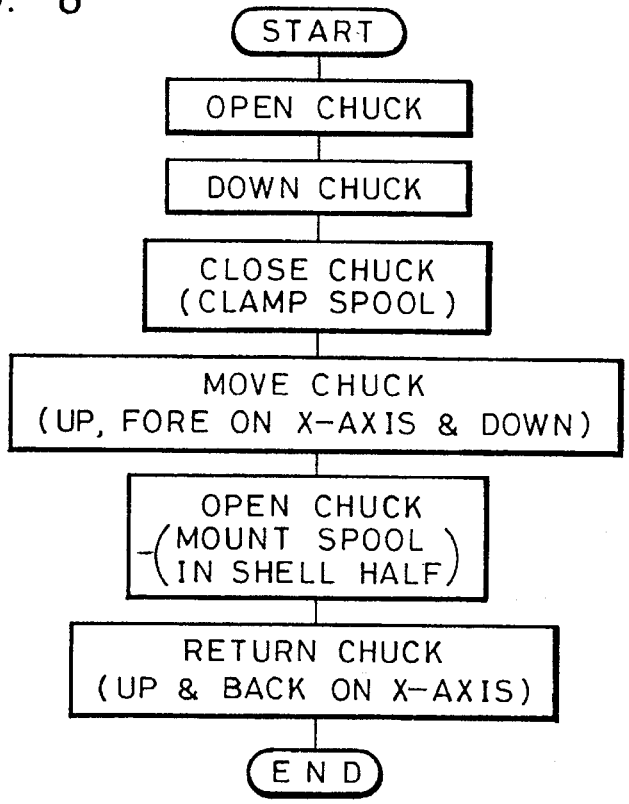
FIG. 8 is a flow chart illustrating the operation of the pick-and-place device shown in FIG. 6.

The above-described operation of the chuck drive mechanism 63 is illustrated in FIG. 7, wherein the respective movement steps of the chuck member 62 are overlapped with each other as much as possible, in order to achieve a lower maximum acceleration. Since the intermediate holder 31 is arranged such that the axis of the spool assembly 12 held thereon intersects the center or axis of the spool holder 29, it is unnecessary to move the spool assembly 12 in the X-axis direction in the station S4. Therefore, the chuck drive mechanism 63 can be simple in construction, and may be less accurate than the conventional chuck drive mechanism 86.

In the fifth assembling station S5, the pick-and-place device 50 mounts the lower shell half 8 in the shell holder 30 of the pallet 28. In the sixth assembling station S6, the shutter 14 is mounted in the semi-cylindrical recess 23 of the lower shell half 8.

In the seventh station S7, the spool assembly 12 held on the intermediate holder 31 is clamped by the chuck members 64a and 64b. At that time, one of the chuck members 64a and 64b is set in a reference clamp position for centering the spool assembly 12. In this way, the position of the spool assembly 12 on the intermediate holder 31 is corrected in the station S7, in addition to the rough positioning on the intermediate holder 31 in the station S4. The chuck members 64a and 64b are then moved concurrently in the Z-axis and the Y-axis directions to mount the spool assembly 12 in the lower shell half 8 in the shell holder 30. The sequence of this operation is shown in FIG. 7.

Since the intermediate holder 31 and the shell holder 30 are arranged to hold the spool assembly 12 parallel to each other, and the position of the spool assembly 12 in the Y-axis direction is unchanged between the shell holder 30 and the intermediate holder 31, it is unnecessary to move the spool assembly 12 in the Y-axis direction in the station S7. Accordingly, a high accuracy is achieved with respect to the Y-axis direction, and the residual vibration in the Y-axis direction is minimized. Moreover, since the chuck members 64a and 64b will not interfere with the lower shell 8 in the shell holder 30, the chuck members 64a and 64b can bring the spool assembly 12 as close to the lower shell half 8 as possible when releasing the clamp of the spool assembly 12. Therefore, the spool assembly 12 is stably mounted in the lower shell half 8.

In the eighth assembling station S8, the pick-and-place device 50 joins the upper shell half 7 to the lower shell half 8 in the shell holder 30, to complete the cassette shell 10. In the last station S9, the pick-and-place device 50 removes the cassette shell 10 from the shell holder 30 to transfer the complete cassette shell 10 to another process. The pallet conveyer 40 feeds the empty pallet 28 back to the first assembling station S1. The control and activation of various functions with the pick-and-place devices 50 are well known.

As described so far, the spool assembly 12 is not directly moved from the spool holder 29 to the lower shell half 8 in the shell holder 30, but is transitionally held in the intermediate holder 31. Because the position of the spool assembly 12 is corrected on the intermediate holder 31, this method ensures the high accuracy necessary for mounting the spool assembly 12 in the lower shell half 8. Furthermore, it is unnecessary to limit the size of the chuck member 62 so as not to interfere with the hooks 8b or other element of the lower shell half 8. This enables a stable grip or clamp of the spool assembly 12.

Figure 9:
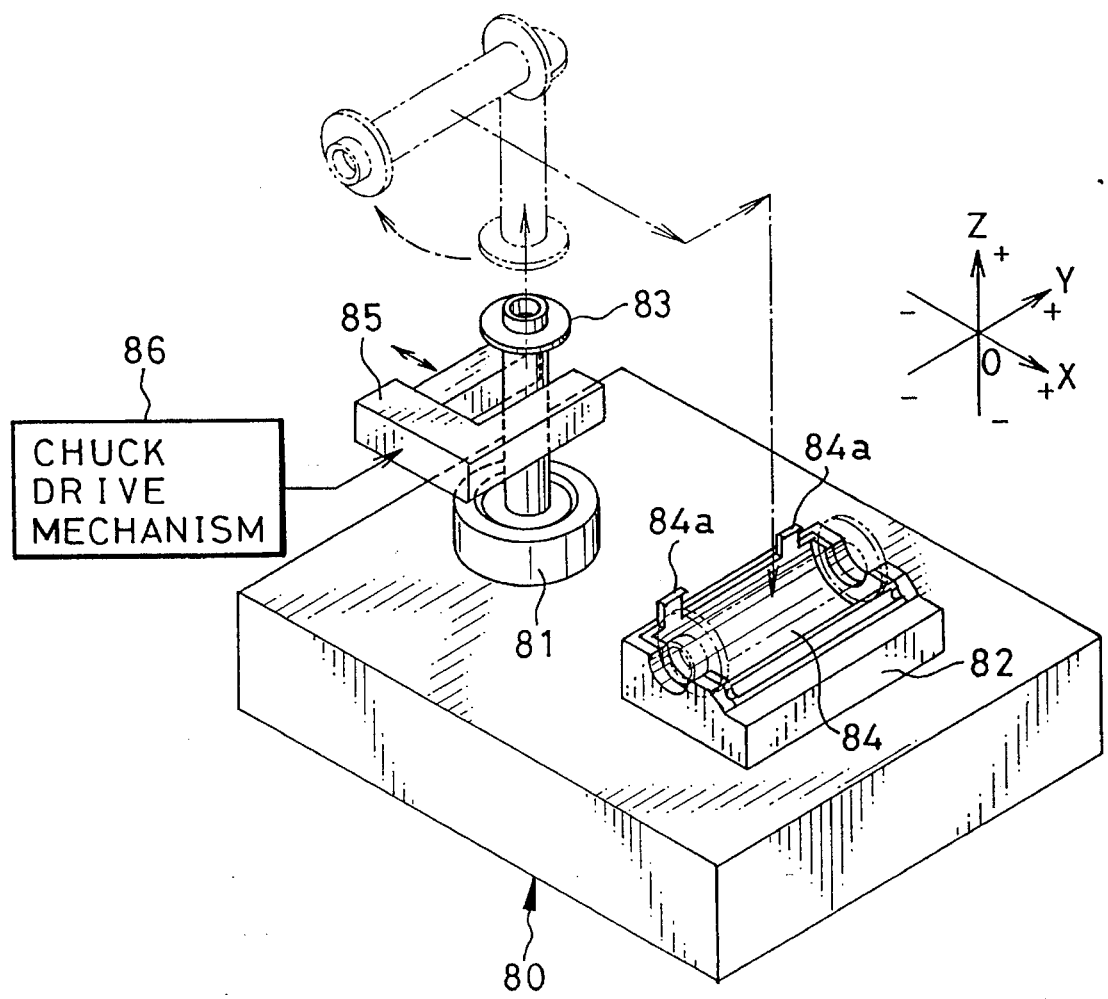
FIG. 9 is an explanatory view of a conventional pallet utilized for assembling the leader-advancing film cassette as shown in FIG. 1.

Since the recesses 32 of the supporting members 31a and 31b of the intermediate holder 31 may have a larger play to the spool core 12a than the shell halves 7 and 8, the chuck drive mechanism 63 can operate with less accuracy compared with the conventional device shown in FIG. 9. Although two stations must be provided for mounting the spool assembly 12 in the lower shell half 8, the total amount of movement of the spool assembly 12 in each station is reduced. Therefore, the chuck drive mechanisms 63 and 65 can be small, and the maximum acceleration thereof can be limited to a low level.

Although the above-described embodiment relates to an assembling apparatus for assembling the cassette shell 10 as shown in FIG. 1, the present invention is applicable to another type cassette shell having a spool assembly. The present invention is preferable especially for a spool assembly whose spool core is constituted of two or more separate parts, or has an uneven or resilient peripheral surface. Although such a spool assembly can be difficult to uniformly and stably hold at the spool core, the intermediate holder 31 enables the spool assembly to be held at its opposite ends in the horizontal state when mounting in a lower shell half.

The sequence of assembly is not to be limited to the above embodiment. For example, it is possible to first place the lower shell half 8 in the shell holder 30, and thereafter assemble the spool assembly 12 in the side of the spool holder 29, and thereafter start assembling in the side of the shell holder 30. The flanges may be secured to the spool core through hooking, caulking, cementing or the like. It is, of course, possible to provide more than nine stations so as to assemble a cassette shell having a larger number of parts than the cassette shell shown in FIG. 1, such as disclosed in U.S. Pat. No. 5,049,912. It is also possible to wind the photographic filmstrip 24 on the spool core 12a before the upper shell half 7 is joined to the lower shell half 8. The holders 29, 30 and 31 may be integrally formed with the pallet 28, or may be securely mounted on the pallet 28. The pallet 28 may be conveyed in another direction, e.g., in the Y-axis direction in the drawings.

Although the present invention has been described with reference to a preferred embodiment, various modifications within the scope and spirit of the invention will be apparent to those of working skill in this technological field. Thus, the invention should be considered as limited only by the appended claims.

What is claimed is:

1. In a method for assembling photographic film cassettes, each of said cassettes having at least a pair of shell halves and a spool assembly coaxially and rotatably mounted between said shell halves, comprising the steps of:

conveying a plurality of pallets having the same construction stepwise to stop at a series of stations;

feeding parts of one of said photographic film cassettes, including corresponding shell halves and parts of a corresponding spool assembly, to each of said pallets, one part per station, in a predetermined sequence;

assembling each of said spool assemblies at a corresponding spool holder provided on a corresponding pallet, with said spool holder holding its corresponding spool assembly with its axis oriented vertically; and assembling said pair of shell halves, said spool assembly and any other parts of each photographic film cassette into a photographic film cassette at a corresponding shell holder provided on a corresponding pallet, with said shell holder holding its corresponding pair of shell halves with its axis oriented horizontally;

the improvement comprising the steps of:

providing an intermediate holder on each of said pallets for holding a corresponding spool assembly with its axis oriented horizontally;

moving each of said spool assemblies, after said spool assembling step, from said spool holder on a corresponding pallet to said intermediate holder on the same pallet; and mounting each of said spool assemblies, after said moving step, in the pair of shell halves held in said shell holder of said same pallet.

2. The method as recited in claim 1, wherein said moving step and said mounting step are each performed at one of said stations.

3. The method as recited in claim 2, wherein each of said spool assemblies comprises a spool core and a pair of flanges fitted to opposite ends of said spool core, each of said flanges having a hole formed therein for receiving said spool core, and said assembling step of each spool assembly comprises the steps of placing one of said flanges in said spool holder, force-fitting one end of said spool core through said one flange, such that said spool core is held in said spool holder with its axis oriented vertically, and force-fitting the other flange on the other end of said spool core.

* * * * *